United States Patent [19]
Davidson

[11] Patent Number: 5,937,961
[45] Date of Patent: Aug. 17, 1999

[54] STROLLER INCLUDING A MOTORIZED WHEEL ASSEMBLY

[76] Inventor: Wayne Davidson, 33 Davis Ave., Valhalla, N.Y. 10595

[21] Appl. No.: 08/662,880

[22] Filed: Jun. 12, 1996

[51] Int. Cl.⁶ ...................................................... B62B 9/22
[52] U.S. Cl. .......................... 180/166; 180/65.1; 280/642
[58] Field of Search .................................. 180/65.1, 166, 180/907; 280/641, 642, 643, 647, 649, 650, 648

[56] References Cited

U.S. PATENT DOCUMENTS

| 12,449 | 2/1855 | Thayer . | |
|---|---|---|---|
| 578,651 | 3/1897 | Morris et al. . | |
| 627,133 | 6/1899 | McDougal . | |
| 632,805 | 9/1899 | Corson . | |
| 665,699 | 1/1901 | Steck . | |
| 704,809 | 7/1902 | Krotz . | |
| 756,152 | 3/1904 | Baldwin . | |
| 810,881 | 1/1906 | Pfouts . | |
| 915,667 | 3/1909 | DuCasse . | |
| 1,593,194 | 7/1926 | Scott . | |
| 2,586,273 | 2/1952 | Steven . | |
| 2,798,565 | 7/1957 | Rosenthal et al. . | |
| 3,820,614 | 6/1974 | Askinazy | 180/166 |
| 3,820,617 | 6/1974 | Groff . | |
| 3,901,337 | 8/1975 | Cragg . | |
| 4,629,950 | 12/1986 | Ching | 180/166 X |
| 5,125,468 | 6/1992 | Coker | 180/907 X |
| 5,161,630 | 11/1992 | Garin, III et al. | 180/907 X |
| 5,168,947 | 12/1992 | Rodenborn . | |
| 5,199,520 | 4/1993 | Chen . | |
| 5,351,774 | 10/1994 | Okamoto | 180/907 X |
| 5,370,572 | 12/1994 | Lee . | |

FOREIGN PATENT DOCUMENTS

002688181A1  9/1993  France ..................................... 180/166

Primary Examiner—Peter M. Poon
Assistant Examiner—Pamela J. Lipka
Attorney, Agent, or Firm—Frishauf, Holtz, Goodman, Langer & Chick, P.C.

[57] ABSTRACT

A motorized stroller includes a first frame member adapted to support a seat for placement of an infant and a pair of wheels for movement of the first frame member along the ground. The motorized stroller also includes a motorized wheel assembly having a motorized wheel frame adapted for attachment to the first frame member, a pair of wheels coupled thereto, a motor for driving at least one of the wheels attached to the motorized wheel frame, and a gear reduction unit operatively coupling the motor to at least one of the wheels of the motorized wheel frame. When the motor operates, power is provided from the motor by the gear reduction unit to at least one of the wheels of the motorized wheel frame which enables the stroller to move in one of a forward and reverse direction without power for movement being provided by a user. The motorized wheel assembly is capable of being disengaged such that the motorized stroller can be manually pushed by a user and therefore used in a conventional fashion.

23 Claims, 5 Drawing Sheets

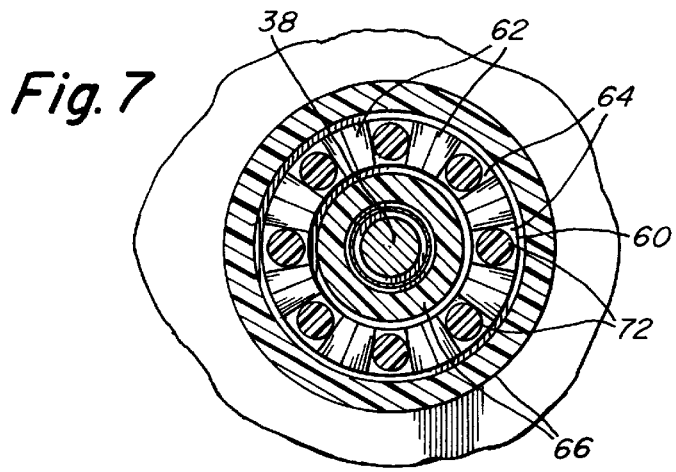
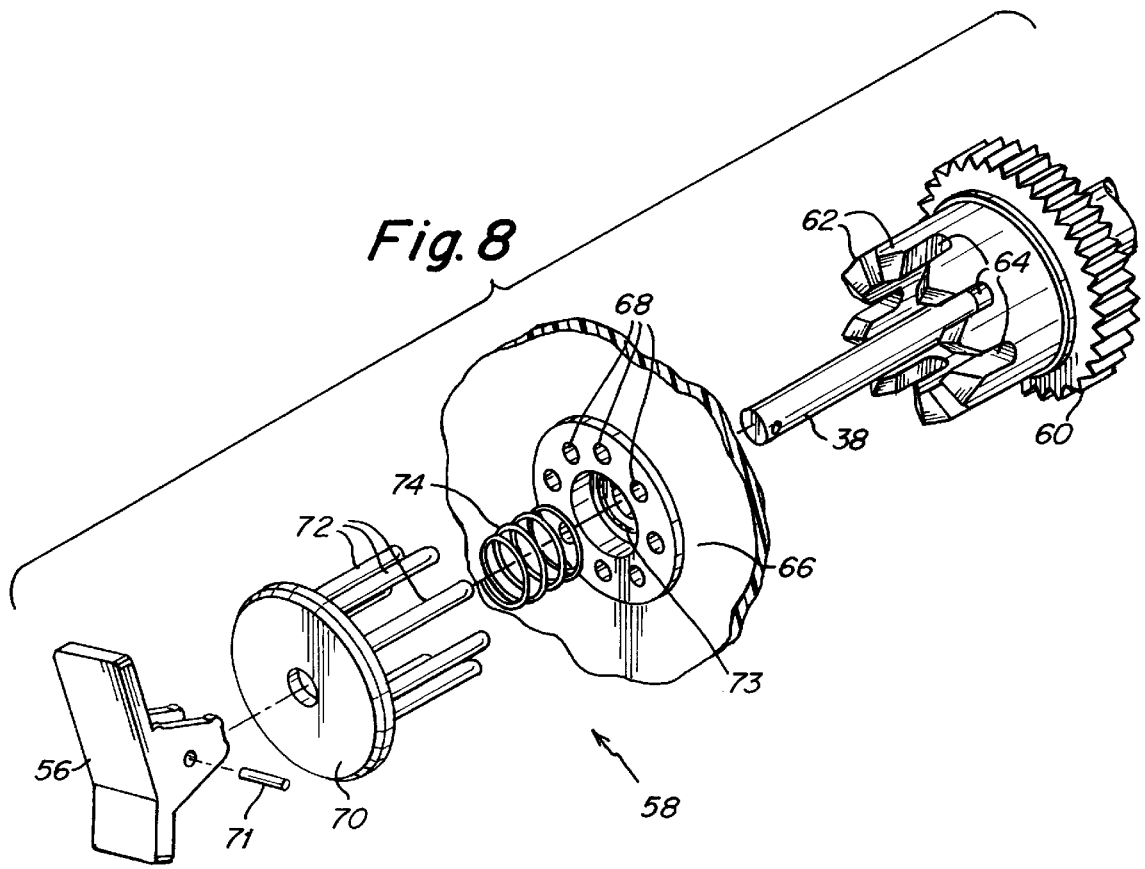

STROLLER INCLUDING A MOTORIZED WHEEL ASSEMBLY

BACKGROUND OF THE INVENTION

1. Field of the Invention

The present invention relates to motor driven devices and the like, and more particularly to a motorized unit adapted to be coupled to a conventional stroller to transform the conventional stroller into a motorized stroller.

2. Description of the Related Art

Conventional baby strollers (i.e., non-motorized strollers) have been known and used for many years. When the child who is to be transported in the stroller is an infant, the stroller is relatively easy to push. However, as the child grows and gains weight, or when packages are attached to the stroller while shopping, the stroller becomes increasingly difficult to push. In addition, when the stroller is to be moved up an incline, the person pushing the stroller may have substantial difficulty in traversing the incline. This is especially true when the person pushing the stroller has a physical ailment (i.e., orthopedic or muscular), is a small framed person, or is elderly.

OBJECTS AND SUMMARY OF THE INVENTION

It is therefore an object of the present invention to provide a motorized stroller.

It is a further object of the present invention to provide a motorized stroller wherein the motor can be selectively engaged and disengaged by the user.

It is yet a further object of the present invention to provide a motorized stroller that is capable of providing movement in a forward direction and a rearward direction.

It is another object of the present invention to provide a motorized stroller that is battery powered.

It is still a further object of the present invention to provide a motorized unit adapted to be coupled to a conventional stroller and the like to provide a motorized stroller.

It is still another object of the present invention to provide a motorized stroller which overcomes inherent disadvantages of known motorized strollers.

In accordance with one form of the present invention a motorized stroller includes a first frame member adapted to support a seat for placement of an infant and a pair of wheels for movement of the first frame member along the ground. The motorized stroller also includes a motorized wheel assembly having a motorized wheel frame adapted for attachment to the first frame member, a pair of wheels coupled thereto, a motor for driving at least one of the wheels attached to the motorized wheel frame, and a gear reduction unit operatively coupling the motor to at least one of the wheels of the motorized wheel frame. When the motor operates, power is provided from the motor by the gear reduction unit to at least one of the wheels of the motorized wheel frame which enables the stroller to move in one of a forward and reverse direction without power for movement being provided by a user.

A preferred form of the motorized stroller, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 7 is a cross-sectional view of the motorized wheel taken along lines 7—7 of FIG. 5.

FIG. 8 is an exploded perspective view of a locking hub assembly of the drive wheel.

DETAILED DESCRIPTION OF THE PREFERRED EMBODIMENTS

Figure 1:
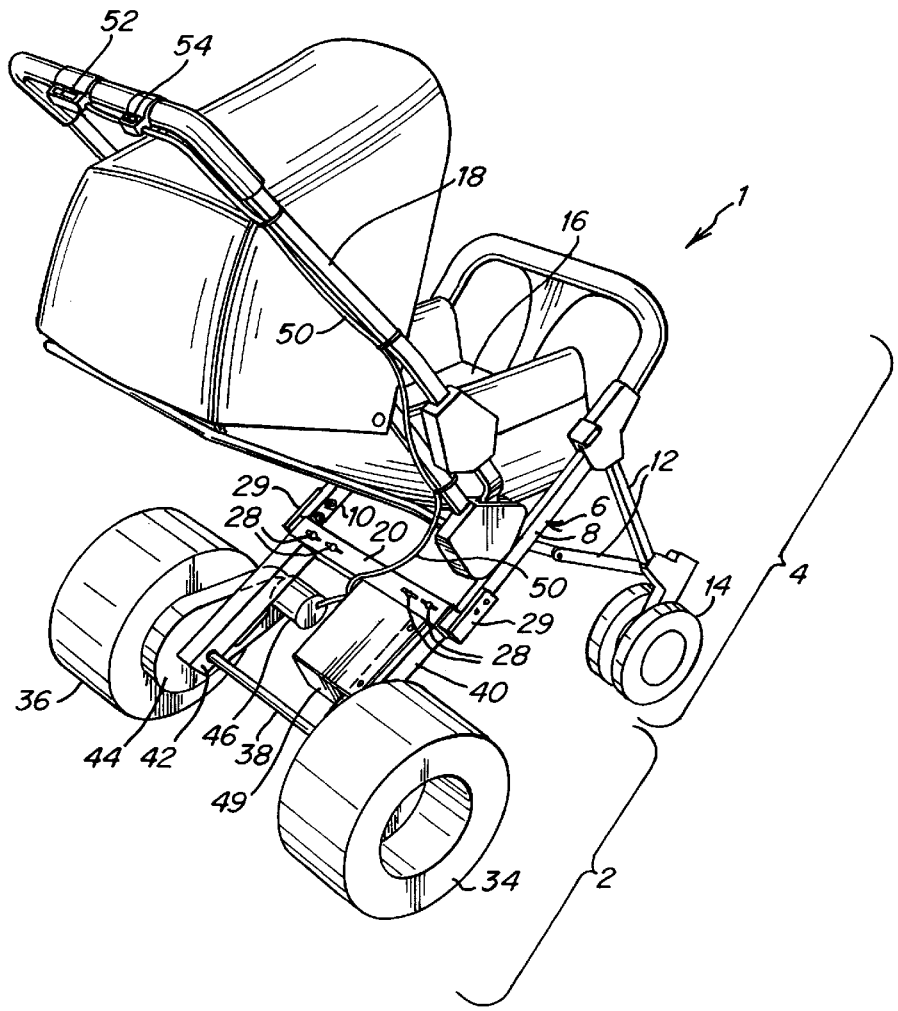
FIG. 1 is a perspective view of a stroller having a motorized wheel assembly incorporated therewith in accordance with the present invention.

Referring now to the drawings, a motorized stroller 1 constructed in accordance with the present invention is shown. The motorized stroller 1 includes a motorized wheel assembly 2 operatively connected to a modified conventional baby stroller 4. It is foreseen that the motorized stroller can be produced having the motorized wheel assembly integral therewith. Alternatively, the motorized wheel assembly 2 can be purchased separately and an existing baby stroller can be modified (as described below) to connect the motorized wheel assembly thereto to provide the motorized stroller.

The motorized stroller 1 includes a stroller main frame member 6 having first and second sides 8, 10. The motorized stroller also includes front wheel frame members 12 coupling the non-motorized front wheel assemblies 14 to the stroller main frame member 6. A child support seat 16 for placement of a child therein, is coupled to the stroller main frame member 6. Also coupled to the stroller main frame member 6 is a stroller handle 18. As shown in FIG. 1, the motorized wheel assembly 2 is attached to the stroller main frame member first and second sides 8, 10, and preferably replaces the non-motorized rear wheel assemblies (not shown) of the conventional stroller.

Figure 2:
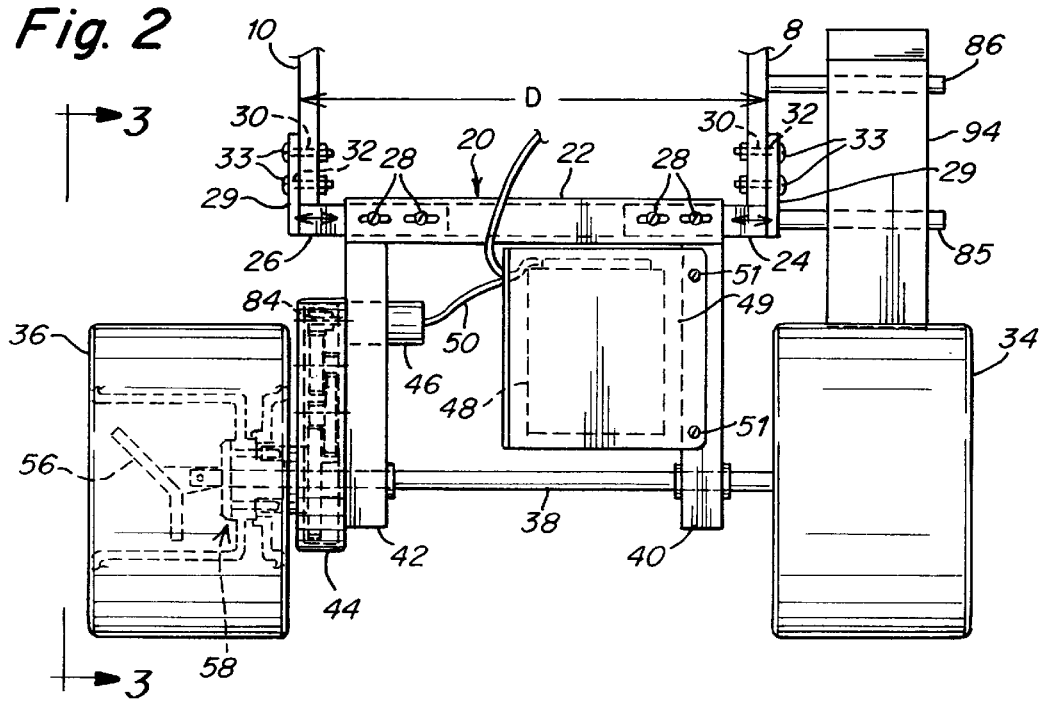
FIG. 2 is a cross-sectional view of the motorized wheel assembly and breaking mechanism taken along lines 2—2 of FIG. 10.

Referring still to FIG. 1 and more particularly to FIG. 2, the motorized wheel assembly preferably includes telescoping tubing 20 which is adapted to be connected to the stroller main frame member 6. The telescoping tubing 20 preferably includes a mid-section 22 and first and second end sections 24, 26. The mid-section 22 is substantially hollow which permits the first and second end sections to slidably traverse therein. As the first and second end sections are pushed in and pulled out of the mid-section 22, the overall length of the telescoping tubing 20 is adjusted. The first and second end sections 24, 26 are preferably positioned within the mid-section so that the overall length of the tubing 20 is substantially coincident with the distance D between the outer dimension of the first and second sides 8, 10 of the stroller main frame member 6.

The telescoping tubing 20 preferably includes adjustment screws 28 which can be manipulated in a conventional manner to permit the first and second end sections 24, 26 to slide within or over the mid-section 22. Once the overall length of the telescoping square tubing assembly has been adjusted to be substantially coincident with the distance D, the adjustment screws 28 are tightened to fix the length of the telescoping tubing.

The motorized wheel assembly 2 is preferably connected to the stroller main frame member first and second sides 8, 10 as shown in FIGS. 1 and 2. Specifically, the telescoping tubing 20 includes end brackets 29 which attach to the stroller main frame member 6. The first and second sides 8, 10 of the stroller main frame member 6 preferably include a pair of holes 30 therethrough which are designed to be aligned with holes 32 of the end brackets 29. Once the holes 30 of the stroller main frame member 6 are aligned with the holes 32 of the end brackets 29, a screw 33 or other suitable means are utilized to secure the end brackets to the first and second sides 8, 10 of the stroller main frame member 6. While a screw attachment of the telescoping square tubing assembly to the stroller main frame member is shown and disclosed, it is foreseen that other suitable means for attaching the telescoping tubing 20 to the first and second sides 8, 10 of the stroller main frame member 6 may be utilized.

The motorized wheel assembly 2 also preferably includes a first freely rotating wheel 34 and a second wheel 36 which is selectively motorized to provide the drive to propel the stroller in one of a forward and rearward direction. The first freely rotating wheel 34 and the second selectively motorized wheel 36 are coupled via an axle 38. The telescoping tubing is coupled to the axle via first and second wheel assembly support members 40, 42.

The motorized wheel assembly 2 also includes a gear assembly 44, a motor 46 operatively coupled thereto, and a battery 48 coupled to the motor to provide power for operation of the motorized wheel assembly. The motor 46 is adapted to drive the motorized wheel 36, but it will be appreciated that either or both wheels 34, 36, may be power driven. The motor 46 is preferably reversible so that the stroller may be operated in either a forward or rearward direction. The motor 46 may be of any suitable type, and commercially available motors which are compact in size, with low mass, high torque, and variable speed are preferred. The motor is preferably powered by a rechargeable battery. Commercially available batteries which are small in size and yet have ample energy storage capacity to power the motor for moving the carriage for several hours are preferred.

The battery 48 of the present invention is preferably retained in a battery compartment 49 attached to motorized wheel assembly support member 40. In the preferred embodiment, the battery compartment includes a base and a cover defining a spacing therebetween for placement of battery 48. The cover is preferably hinged along one side thereof and access screws 51, or other means of selectively securing the cover to the base, is provided on an opposite length of the cover. The battery compartment 49 is preferably made of an ABS plastic. However, other materials are suitable and may be utilized.

Operatively coupled to the motor 46 and battery 48 via a wiring harness 50 is a speed control switch 52 and a direction control switch 54. The wiring harness 50 is preferably held close along the stroller handle so as to not interfere with the operation of the stroller and so as not to be accessible to a child who is placed in the child support seat 16. The speed control switch 52 and direction control switch 54 are preferably located on the stroller handle 18 so that the direction and speed of travel of the stroller can be relatively easily selected and modified by the user. The direction control switch 54 preferably has both forward and reverse directions. The speed control switch is preferably a variably sliding switch so that any speed within the operating range of the motorized wheel assembly can be selected by the user. It is foreseen that the speed control switch 52 can also include discrete predetermined speed control settings (i.e., speed 1, 2, 3 and 4).

The present invention preferably includes a "dead man feature". Specifically, in order to operate the motorized wheel assembly in a forward or reverse direction, the direction control switch must be continually activated by the user. Once the direction control switch is no longer activated (i.e., the user releases the direction control switch), battery power will cease being provided to the motor (described below) and the motorized wheel assembly will stop rotating. This is an important safety feature because a user would not want the stroller to continue to operate with a child in the stroller if the user falls or inadvertently activates the direction control switch.

Figure 9:
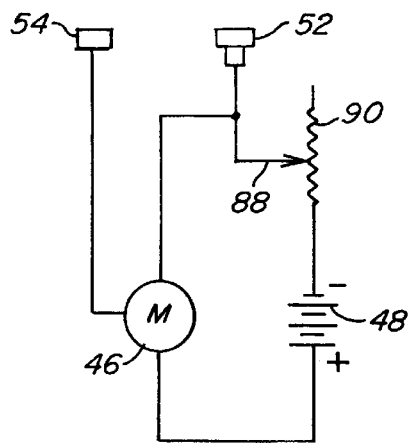
FIG. 9 is a circuit diagram of the electrical circuit employed in the present invention.

As shown in FIG. 9, the speed control slide switch preferably controls the position of a wiper 88 with respect to a resistor 90 of a linear rheostat. In a fully open position of the speed control slide switch 52, the wiper 88 is in an uppermost position, clear of the resistance, and no current flows from the battery 42 to the motor 46 and therefore no power is applied to the wheels. As the speed control slide switch 52 is pushed in an opposite direction, less resistance is interposed in the circuit and thus the motor shaft is driven at a greater speed.

In an alternative embodiment of the invention, the speed and direction controls are combined into a single control mechanism 91 (see FIG. 10) wherein movement of the control mechanism in a specific direction will indicate the direction of travel (i.e., forward or reverse) and the amount of movement of the control mechanism will indicate the speed of the movement. In this alternative embodiment, the dead man switch may be integrated in the single control mechanism 91 or a separate on/off control mechanism 92 may function as the "dead-man" control.

As shown in phantom in FIG. 2, the motorized wheel 36 includes a locking hub lever 56. As will be explained in more detail below, when activated, the locking hub lever effectuates engagement of the motorized wheel 36 and the gear reduction unit 44 such that the motor will cause the motorized wheel 36 to rotate and to propel the stroller.

Figure 4:
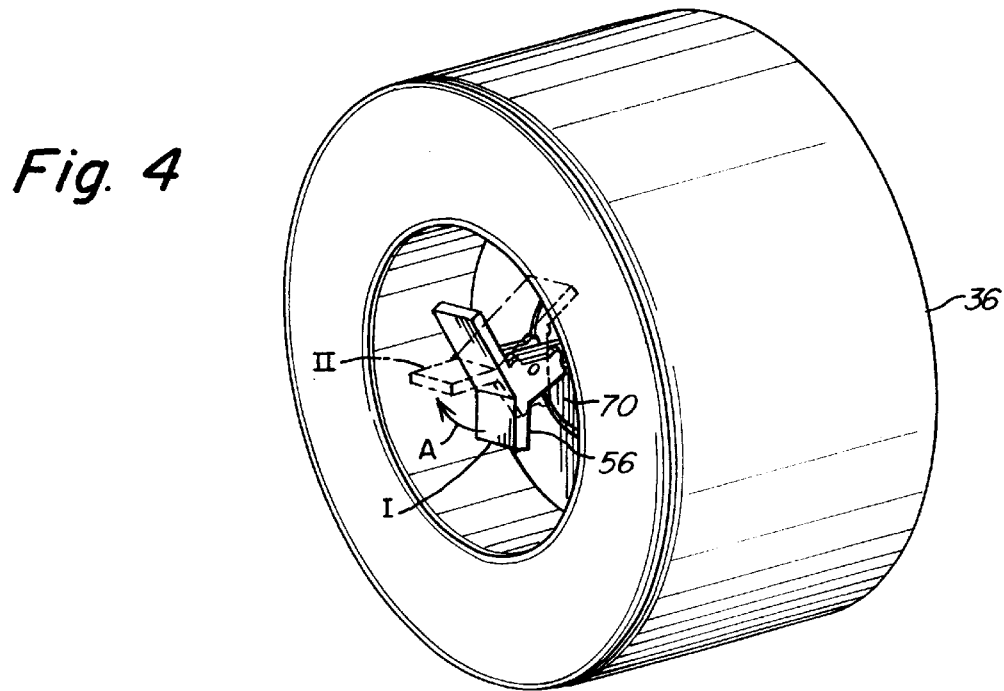
FIG. 4 is a perspective view of a drive wheel of the motorized wheel assembly in accordance with the present invention showing first and second positions of a locking hub lever.

Referring now to FIG. 4, a perspective view of the motorized wheel 36 and the locking hub lever 56 is shown. A first position of the locking hub lever designated I shows the locking hub lever 56 in the engaged position such that the motorized wheel 36 (i.e., locking hub assembly 58) will engage the gear reduction assembly 44. When the locking hub lever 56 is rotated in the direction of arrow A to the position designated II, the locking hub lever 56 effectively disengages the motorized wheel 36 from the gear reduction assembly 44 (unengaged position) so that the wheel can rotate freely and not be driven by the motor 46. The locking hub lever and motorized wheel are preferably designed so that a user can manipulate the locking hub lever 56 with his foot thereby reducing the need for bending, and reducing the difficulty of switching between the engaged and unengaged positions.

Figure 5:
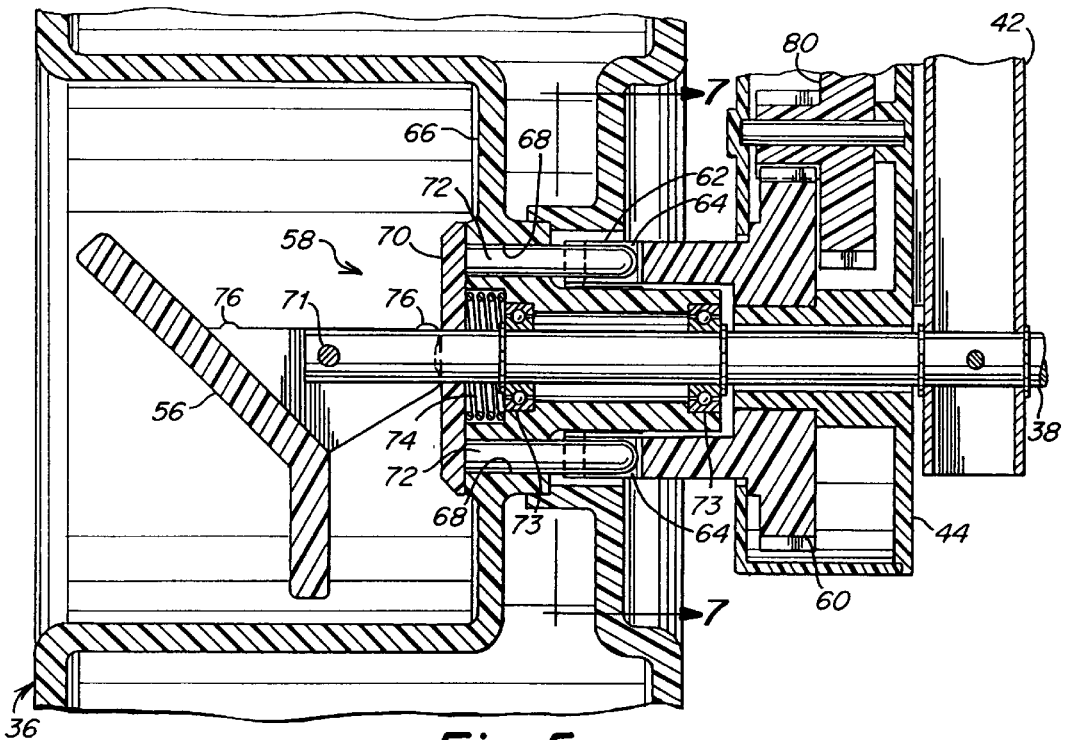
FIG. 5 is a cross-sectional view of the motorized wheel assembly in accordance with the present invention taken along lines 5—5 of FIG. 3 wherein a motorized wheel is operatively coupled to a gear reduction unit.
Figure 6:
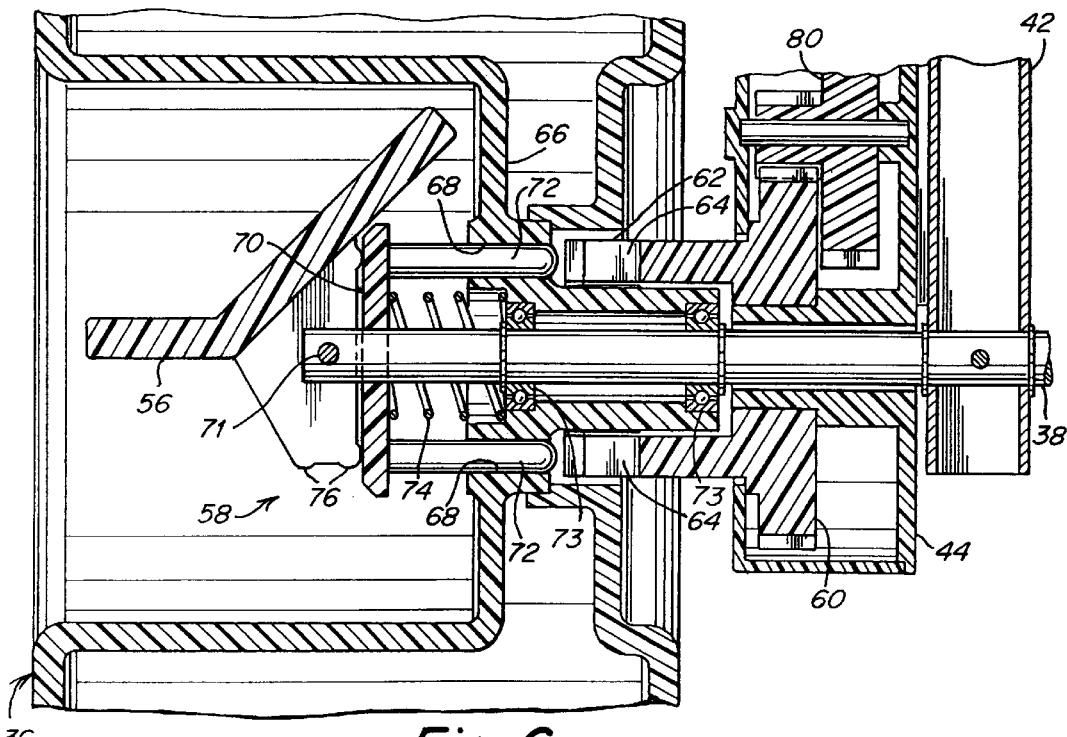
FIG. 6 is a cross-sectional view of the motorized wheel assembly in accordance with the present invention taken along lines 5—5 of FIG. 3 wherein a motorized wheel is not coupled to the gear reduction unit.

Referring now to FIG. 8, an exploded perspective view of the locking hub assembly 58 is shown. The locking hub assembly 58 includes a drive gear 60 having protrusions 62 which extend from one surface of the gear which define slots 64 therebetween. The locking hub assembly also includes a wheel hub 66 having a plurality of apertures 68, and a pin collar 70 having protrusions 72 extending therefrom and through the apertures 68 of the wheel hub. The pin collar protrusions 72 also selectively engage (i.e., depending upon the position of the locking hub lever 56) the slots 64 of the drive gear 60. A biasing spring 74 is preferably interposed between the pin collar 70 and the wheel hub 66 so as to bias the protrusions 72 of the pin collar in a nonengageable position with the slots 64 of the drive gear 60. However, when the locking hub lever 56 is rotated to position I of FIG. 4, the biasing spring compresses and the protrusions 72 operatively engage slots 64. As shown in FIGS. 5 and 6, axle 38 extends through a central opening of the pin collar 70, wheel hub 66 and drive gear 60. Pin 71 couples the locking lever 56 to the axle 38 so as to maintain the vertical orientation of the locking lever for easy activation by a foot and to prevent the possibility of loose garments, etc. becoming unsnarled plus wrapping up in the hub when the wheel is rotated. As shown in FIGS. 5 and 6, the assembly also includes bearings 73, as known in the art.

FIGS. 5 and 6 show the effect of the two alternative positions of the locking lever 56. In FIG. 5 (engaged position), the locking hub lever 56 is rotated such that the pin collar 70 is pushed inward, compressing the biasing spring 74 (Position I of FIG. 4). The pins 72 of the pin collar 70 engage the slots 64 of the drive gear 60 such that a rotation of the drive gear will cause rotation of the pin collar 70 thereby rotating the motorized wheel 36.

FIG. 6 shows the locking hub lever 56 in the second position (unengaged position corresponding to Position II of FIG. 4) wherein the biasing spring 74 biases the pin collar 70 in a position which is substantially disengaged from the slots 64 of the drive gear 60. As shown in FIGS. 5 and 6, the locking hub lever 56 also includes protrusions 76 extending from at least one of the surfaces which engage the pin collar. The protrusions 76 serve to reduce friction against the pin collar since only the protrusions and not the entire surface of the lever 56 engage the pin collar.

Figure 3:
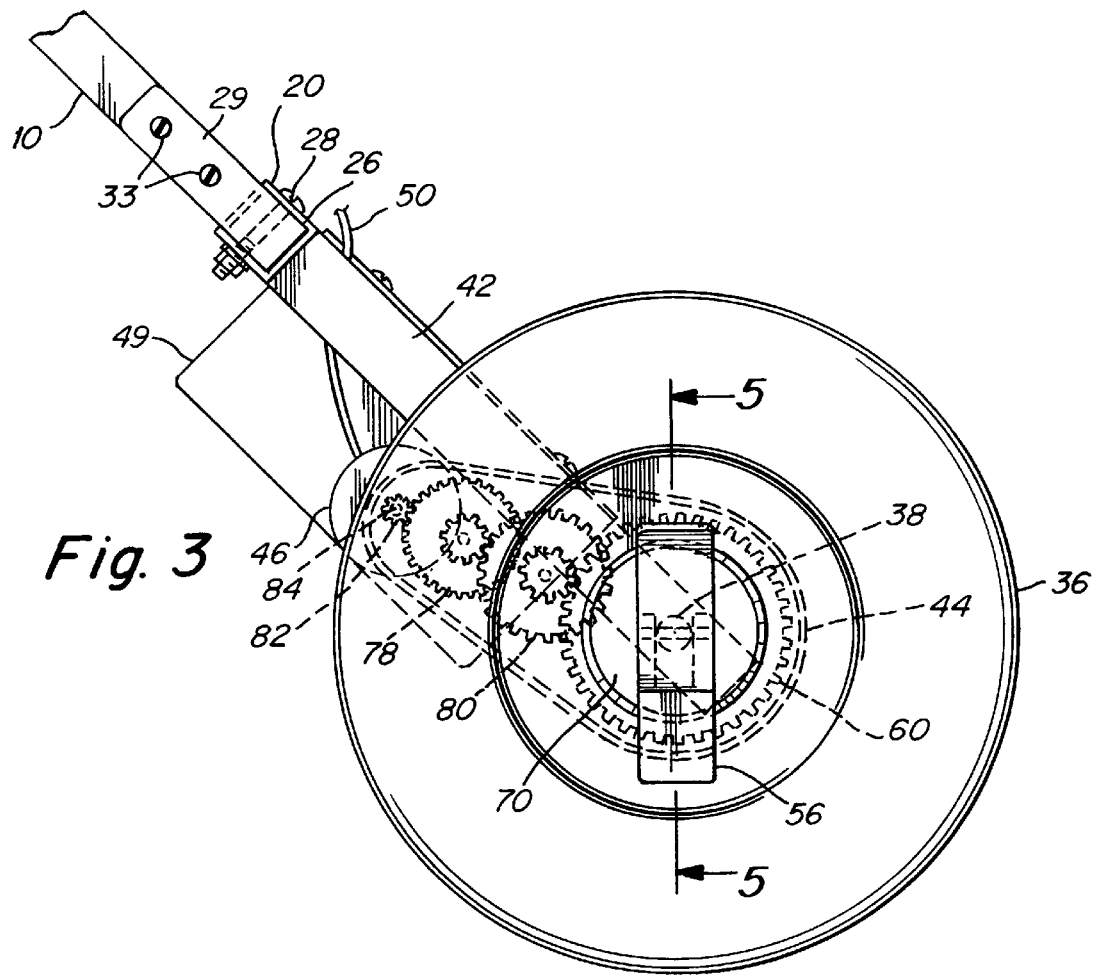
FIG. 3 is a side view of the motorized wheel assembly taken along lines 3—3 of FIG. 2.

Referring now to FIG. 3, gear assembly housing 44 is preferably made of plastic, metal, or other suitable material. The gear assembly housing is preferably made in two complementary halves to define a predetermined spacing between inner surfaces of the housing halves. The gear assembly housing 44 preferably contains at least first and second gears 78, 80. The gear assembly housing 44 also encloses a pinion 82 coupled to a shaft 84 which extends from the motor 46. As the shaft of the motor 46 rotates, pinion 82 attached to the end of the shaft will also rotate.

The first gear 78 of the gear assembly housing 44 engages pinion 82. The second gear 80 of the gear assembly housing engages the first gear 78 of the gear assembly housing. The drive gear 60 engages the second gear 80 of the gear assembly housing. As a result, when the motor is actuated and the pinion 82 is caused to rotate, the rotation will be transferred via the first and second gears to the drive gear. When the locking hub lever 56 is actuated (i.e., position I of FIG. 4), such that the protrusions 72 of pin collar 70 engage the slots 64 of the drive gear 60, the motorized wheel of the wheel assembly 2 will also rotate.

In operation, when a user desires to activate the motor 46 to provide drive to the motorized wheel assembly 2, the user rotates the locking hub lever 56 into the position designated I shown in FIG. 5. In position I, the locking hub lever 56 contacts the pin collar 70 compressing biasing spring 74 such that the protrusions 72 of the pin collar operatively engage the slots 64 of the drive gear 60. Thereafter, the speed and direction control switches 52, 54 are manipulated by the user to drive the motorized wheel 36 to propel the stroller 1 in the selected direction (i.e., either the forward or reverse direction) at an appropriate speed selected by the user.

When the user desires to utilize the stroller in a conventional manner (i.e., without the benefit of operation of the motor), the user releases the direction control (and/or reduces the speed control switch to its minimal value) and the carriage is permitted to come to a complete rest. Once the stroller comes to a complete stop, the locking hub lever 56 is rotated to the position shown in FIG. 6 (i.e., position II of FIG. 4) so that the biasing spring 74 biases the pin collar 70 in a position which is unengaged with the drive gear 60 (i.e., the protrusions 72 of the pin collar 70 are substantially unengaged with respect to the drive gear slots 64). As a result, the stroller can be pushed by the user in a conventional manner.

Figure 10:
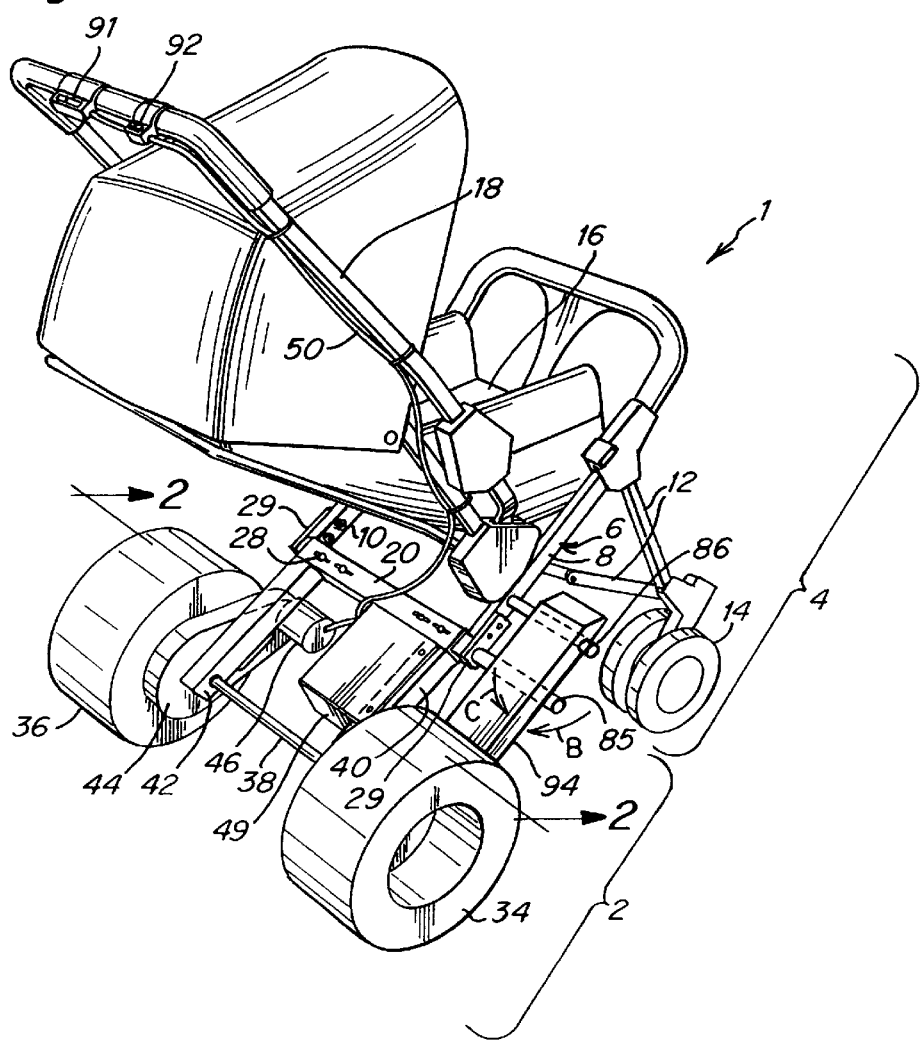
FIG. 10 is a perspective view of a stroller having a motorized wheel assembly and braking mechanism incorporated therewith in accordance with the present invention.

In an alternative embodiment, a braking mechanism 94 (shown in FIGS. 2 and 10) which is pivotable about pin 86 is included which may be activated by a user. When the carriage is at rest and the locking hub lever 56 is in the unengaged position and prevention of carriage movement is desired, the brake mechanism is rotated about pin 86 in the direction of arrow C such that its edge engages wheel 34 to prevent rotation of the wheel. A stopper 85 is included to prevent movement of the braking mechanism and to lock the braking mechanism in engagement with wheel 34. When it is desired to release the braking mechanism, the braking mechanism is rotated in the direction of arrow B. As a result, the frictional engagement is released and the braking mechanism will not interfere with the rotation of tire 34. The braking mechanism is designed to be easily activated by a user's foot and preferably prevents the stroller from movement when the motorized wheel 36 is either engaged or unengaged. While one braking mechanism is shown in FIG. 10, a second braking mechanism may be included for motorized wheel 36 and for preventing movement in a rearward direction. Other suitable braking mechanisms which are manually activated to engage the wheels of the carriage or the mechanical/electrical components of the motorized wheel assembly may be employed. The braking mechanism is an optional component of the motorized wheel assembly and need not be included for proper operation of the motorized stroller.

The tires used for the motorized wheel assembly are preferably wider than the tires usually found on a baby carriage. The wider tires are preferred so that the carriage can traverse rough terrain more easily than with smaller tires. Preferably, the tires have a width of at least three inches and preferably in the range of 3 to 6 inches.

The present invention is preferably designed such that the addition of the motorized wheel assembly will not interfere with the fold-up capability of the stroller. In addition, it is foreseen that a braking mechanism may be incorporated into the motorized wheel assembly to actively brake the rear wheels. This might include the addition of a further control for braking on the stroller handle 18.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A motorized stroller comprising:
   a first frame member operatively adapted to support a seat for placement of an infant, the first frame member having at least one wheel for movement of the first member along the ground; and
   a motorized wheel assembly comprising:
      a frame adapted for attachment to the first frame member, the frame having at least one wheel coupled thereto for movement along the ground;
      a motor for driving said at least one wheel of said frame, the motor having a shaft and a pinion attached thereto;
      a gear reduction unit coupled to said frame, said gear reduction unit having a drive gear selectively operatively coupled to said at least one wheel of said frame and rotatable therewith, the drive gear being operatively coupled to the pinion of said motor;
      a direction control switch operatively coupled to the motor for selectively causing the motor to rotate continuously in a first direction of operation until the direction control switch is operated again thereby causing the motor to cease rotating in the first direction of operation until the direction control switch is operated again; and
      a speed control switch operatively coupled to the motor for controlling the speed of operation of the motor;
         wherein the direction control switch must be substantially continuously actuated to maintain operation of the motor; and
         wherein when said drive gear is operatively coupled to said at least one wheel of said frame and when said motor is operating, the shaft rotates the pinion which operatively engages the drive gear causing said at least one wheel of the frame to rotate.

2. The motorized stroller as defined by claim 1 wherein the direction control switch enables the motorized stroller to move in one of a forward and reverse direction.

3. The motorized stroller as defined by claim 1 further comprising:
   a power supply operatively coupled to the motor for providing power to the motor.

4. The motorized stroller as defined by claim 3 further comprising:
   a power supply retainment means operatively coupled to the frame for encasing the power supply therein.

5. The motorized stroller as defined by claim 3 wherein the power supply is a rechargeable battery.

6. The motorized stroller as defined by claim 1 wherein the frame includes a width adjustment means for altering the width of the frame in order to couple the motorized assembly to the main frame member of the stroller.

7. The motorized stroller as defined by claim 1 wherein the stroller has at least a portion of the first frame member removed so as to enable attachment of the motorized wheel assembly.

8. The motorized stroller as defined by claim 1 wherein the drive gear includes a plurality of axial protrusions defining a plurality of engagement slots, the locking hub assembly comprising:
   a pin collar having a plurality of axial protrusions designed for substantial insertion within the plurality of engagement slots of the drive gear;
   a spring operatively biasing the pin collar such that the plurality of axial protrusions of the pin collar are disjoint with respect to the plurality of engagement slots; and
   a locking hub lever for selectively engaging the pin collar such that the plurality of axial protrusions of the pin collar operatively mate the plurality of engagement slots of the drive gear;
      wherein when the locking hub lever engages the pin collar, the axial protrusions of the pin collar mate the plurality of engagement slots of the drive gear such that the wheel is operatively coupled to the drive gear such that actuation of the motor causes rotation of said at least one wheel.

9. The motorized stroller as defined by claim 1 further comprising:
   a braking mechanism for inhibiting movement of the motorized stroller.

10. A motorized stroller according to claim 1 wherein when the direction control switch is operated again thereby causing the motor to cease rotating in the first direction of operation, the motor then rotates continuously in a second direction of operation until the direction control switch is activated again.

11. A motorized wheel assembly for attachment to a main frame member of a stroller having at least one wheel, the motorized wheel assembly comprising:
   a frame adapted for removable adjustable attachment to the main frame member of the stroller, the frame having at least one wheel coupled thereto for movement along the ground;
   a motor coupled to the frame for driving said at least one wheel of the frame, the motor having a shaft and a pinion attached thereto;
   a gear reduction unit having a drive gear selectively operatively coupled to said at least one wheel of said frame and rotatable therewith, the drive gear being operatively coupled to the pinion of said motor;
   a direction control switch operatively coupled to the motor for selectively causing the motor to rotate continuously in a first direction of operation until the direction control switch is operated again thereby causing the motor to cease rotating in the first direction of operation until the direction control switch is operated again; and
   a speed control switch operatively coupled to the motor for controlling the speed of operation of the motor;
      wherein the direction control switch must be substantially continuously actuated to maintain operation of the motor; and
      wherein when said drive gear is operatively coupled to said at least one wheel of said frame and when said motor is operating, the shaft rotates the pinion which operatively engages the drive gear causing said at least one wheel of the frame to rotate.

12. The motorized stroller according to claim 11 wherein when t he direction control switch is operated again thereby causing the motor to cease rotating in the first direction of operation, the motor then rotates continuously in a second direction of operation until the direction control switch is activated again.

13. The motorized wheel assembly as defined by claim 11 wherein the direction control switch controls one of a forward and reverse direction of operation of the motor.

14. The motorized wheel assembly as defined by claim 11 further comprising:

a power supply operatively coupled to the motor for providing power to the motor.

15. The motorized wheel assembly as defined by claim 14 further comprising:

a power supply retainment means operatively coupled to the frame for encasing the power supply therein.

16. The motorized wheel assembly as defined by claim 14 wherein the power supply is a rechargeable battery.

17. The motorized wheel assembly as defined by claim 11 wherein the frame includes a width adjustment means for altering the width of the frame in order to couple the motorized wheel assembly to the main frame member of the stroller.

18. The motorized wheel assembly as defined by claim 11 wherein the stroller has at least a portion of its frame removed so as to enable attachment of the motorized wheel assembly.

19. The motorized wheel assembly as defined by claim 11 wherein the drive gear includes a plurality of axial protrusions defining a plurality of engagement slots, the motorized wheel assembly further comprising:

a locking hub assembly including:
    a pin collar having a plurality of axial protrusions designed for substantial insertion within the plurality of engagement slots of the drive gear;
    a spring operatively biasing the pin collar such that the plurality of axial protrusions of the pin collar are disjoint with respect to the plurality of engagement slots; and
    a locking hub lever for selectively engaging the pin collar such that the plurality of axial protrusions of the pin collar operatively mate the plurality of engagement slots of the drive gear;
        wherein when the locking hub lever engages the pin collar, the axial protrusions of the pin collar mate the plurality of engagement slots of the drive gear such that the wheel is operatively coupled to the drive gear such that actuation of the motor causes rotation of the at least one wheel.

20. The motorized wheel assembly as defined by claim 11 further comprising a locking hub assembly for one of engaging and disengaging the wheel and the motor.

21. The motorized wheel assembly as defined by claim 1 further comprising:

a braking mechanism for inhibiting rotation of said wheels.

22. A motorized stroller comprising:

a first frame member operatively adapted to support a seat for placement of an infant, the first frame member having at least one wheel for movement of the first member along the ground; and a motorized wheel assembly comprising:
    a frame adapted for attachment to the first frame member, the frame having at least one wheel coupled thereto for movement along the ground;
    a motor for driving said at least one wheel of said frame, the motor having a shaft and a pinion attached thereto;
    a gear reduction unit coupled to said frame, said gear reduction unit having a drive gear selectively operatively coupled to said at least one wheel of said frame and rotatable therewith, the drive gear being operatively coupled to the pinion of said motor; and
    a control mechanism operatively coupled to the motor for controlling the speed of operation of the motor and for causing the motor to rotate continuously in a first direction of operation until the control mechanism is operated again thereby causing the motor to cease rotating in the first direction of operation until the control mechanism is operated again;
        wherein the direction control switch must be substantially continuously actuated to maintain operation of the motor; and
        wherein when said drive gear is operatively coupled to said at least one wheel and when said motor is operating, the shaft rotates the pinion which operatively engages the drive gear causing the at least one wheel to rotate.

23. The motorized stroller according to claim 22 wherein when the direction control switch is manually operated again thereby causing the motor to cease rotating in the first direction of operation, the motor then rotates continuously in a second direction of operation until the direction control switch is manually activated again.

* * * * *